US011840222B2

(12) United States Patent
Tsuchiya

(10) Patent No.: US 11,840,222 B2
(45) Date of Patent: Dec. 12, 2023

(54) VEHICLE CONTROL METHOD, VEHICLE CONTROL DEVICE, AND STORAGE MEDIUM

(71) Applicant: HONDA MOTOR CO., LTD., Tokyo (JP)

(72) Inventor: Masamitsu Tsuchiya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 94 days.

(21) Appl. No.: 17/209,269

(22) Filed: Mar. 23, 2021

(65) Prior Publication Data

US 2021/0300347 A1  Sep. 30, 2021

(30) Foreign Application Priority Data

Mar. 30, 2020  (JP) ................. 2020-061122

(51) Int. Cl.
*B60W 30/09* (2012.01)
*B60W 30/14* (2006.01)
(Continued)

(52) U.S. Cl.
CPC ............ *B60W 30/09* (2013.01); *B60W 10/20* (2013.01); *B60W 30/146* (2013.01);
(Continued)

(58) Field of Classification Search
CPC .... B60W 30/09; B60W 10/20; B60W 30/146; B60W 30/18; B60W 40/105; B60W 2552/53; B60W 60/0027; B60W 40/06; G06V 20/588; G06T 2207/30256; G08G 1/00

See application file for complete search history.

(56) References Cited

U.S. PATENT DOCUMENTS

| 2013/0120575 A1* | 5/2013 | Byun ................. G06F 18/251 |
| | | 348/148 |
| 2015/0217801 A1* | 8/2015 | Takeda ................ B62D 5/0463 |
| | | 701/42 |
| 2019/0072674 A1* | 3/2019 | Otaki .................. G05D 1/0274 |
| 2019/0152473 A1* | 5/2019 | Ohsugi ................ B60W 30/14 |

(Continued)

FOREIGN PATENT DOCUMENTS

| CN | 109425343 | 3/2019 |
| CN | 110114253 | 8/2019 |

(Continued)

OTHER PUBLICATIONS

English Translation of JP-2019209902-A retrieved from Espacenet on Dec. 8, 2022 (Year: 2022).*

(Continued)

*Primary Examiner* — Fadey S. Jabr
*Assistant Examiner* — Faris Asim Shaikh
(74) *Attorney, Agent, or Firm* — AMIN, TUROCY & WATSON, LLP

(57) ABSTRACT

A vehicle control method includes recognizing surrounding conditions of a vehicle and controlling a speed and a steering of the vehicle based on the surrounding conditions of the vehicle. The method includes controlling the vehicle to stop before a stop line such that the vicinity of a center or the center in a width direction of the vehicle is aligned with the vicinity of a center or the center in a length direction of the stop line in a width direction of a road.

10 Claims, 13 Drawing Sheets

(51) Int. Cl.
   *B60W 30/18* (2012.01)
   *B60W 10/20* (2006.01)
   *B60W 40/105* (2012.01)
   *G06V 20/56* (2022.01)

(52) U.S. Cl.
   CPC ........ *B60W 30/181* (2013.01); *B60W 40/105* (2013.01); *G06V 20/588* (2022.01); *B60W 2552/53* (2020.02)

(56) References Cited

U.S. PATENT DOCUMENTS

| | | | |
|---|---|---|---|
| 2019/0244039 A1 | 8/2019 | Tsuchiya et al. | |
| 2019/0286149 A1* | 9/2019 | Miura | G01C 21/3415 |
| 2019/0315366 A1* | 10/2019 | Yoo | B60W 50/0098 |
| 2020/0307622 A1* | 10/2020 | Pomish | B60W 30/0956 |
| 2021/0094577 A1* | 4/2021 | Shalev-Shwartz | B60W 30/0953 |
| 2021/0157330 A1* | 5/2021 | Tran | G06V 10/82 |
| 2022/0130296 A1* | 4/2022 | Kamiya | B60K 35/00 |

FOREIGN PATENT DOCUMENTS

| | | | |
|---|---|---|---|
| CN | 110126823 | 8/2019 | |
| JP | 2003-026026 | 1/2003 | |
| JP | 2017-102666 | 6/2017 | |
| JP | 2019-018848 | 2/2019 | |
| JP | 2019-212095 | 12/2019 | |
| JP | 2019209902 A * | 12/2019 | F02F 1/004 |
| JP | 2020-021295 | 2/2020 | |

OTHER PUBLICATIONS

"stopCrosswalk", uploaded on Oct. 6, 2013. Retrieved from Internet: <https://drivinginstructorblog.com/wp-content/uploads/2013/07/stopCrosswalk.jpg>. (Year: 2013).*

Japenese Office Action for Japanese Patent Application No. 2020-061122 dated Oct. 3, 2023.

Chinese Office Action for Chinese Patent Application No. 202110323257.0 dated Sep. 26, 2023.

* cited by examiner

VEHICLE CONTROL METHOD, VEHICLE CONTROL DEVICE, AND STORAGE MEDIUM

CROSS-REFERENCE TO RELATED APPLICATION

Priority is claimed on Japanese Patent Application No. 2020-061122, filed Mar. 30, 2020, the content of which is incorporated herein by reference.

BACKGROUND

Field of the Invention

The invention relates to a vehicle control method, a vehicle control device, and a storage medium.

Description of Related Art

An automatic steering device that automatically controls the steering of a vehicle on the basis of a relative position between a lane and the vehicle and a position of the lane has been disclosed in the related art (see Japanese Unexamined Patent Application, First Publication No. 2003-026026 and Japanese Unexamined Patent Application, First Publication No. 2019-212095).

However, the automatic steering device may not be able to perform control suitable for a traffic environment.

SUMMARY

The invention was made in consideration of the aforementioned circumstances and an objective thereof is to provide a vehicle control method, a vehicle control device, and a storage medium that can realize control suitable for a traffic environment.

A vehicle control method, a vehicle control device, and a storage medium according to the invention employ the following configurations.

(1) An aspect of the invention provides a vehicle control method that is performed by a computer, the vehicle control method including: recognizing surrounding conditions of a vehicle; controlling a speed and a steering of the vehicle based on the recognized surrounding conditions of the vehicle; and controlling the vehicle to stop before a stop line such that the vicinity of a center or the center in a width direction of the vehicle is aligned with the vicinity of a center or the center in a length direction of the stop line in a width direction of a road.

(2) In the aspect of (1), further comprising: recognizing a road marking, and the controlling the vehicle to travel such that the vicinity of the center or the center of the width direction of the vehicle is aligned with the vicinity of the center or the center in the width direction of the road of the road marking in the width direction of the road.

(3) In the aspect of (1) or (2), further comprising: controlling the vehicle to stop before the stop line such that the vehicle does not hinder traveling of an oncoming vehicle and the oncoming vehicle travels in an area on a second side opposite to a first side on which the vehicle travels.

(4) In the aspect of one of (1) to (3), further comprising: controlling the vehicle to stop before the stop line such that the vehicle does not protrude from the stop line in the width direction of the road.

(5) In the aspect of one of (1) to (4), further comprising: controlling the vehicle to travel in the vicinity of the center or the center in the width direction of the road and to then stop before the stop line such that the vicinity of the center or the center in the width direction of the vehicle is aligned with the vicinity of the center or the center in the length direction of the stop line in the width direction of the road when there is no oncoming vehicle a predetermined distance in front of the vehicle in the road in which a center line for partitioning traffic directions of vehicles is not provided and which has a predetermined width or less.

(6) In the aspect of one of (1) to (5), further comprising: controlling the vehicle to travel in the vicinity of the center or the center in the width direction of the road and to then stop before the stop line such that the vicinity of the center or the center in the width direction of the vehicle is aligned with the vicinity of the center or the center in the length direction of the stop line in the width direction of the road when there is no oncoming vehicle a predetermined distance in front of the vehicle in the road in which a center line for partitioning traffic directions of vehicles is provided and a first side of the center line and a second side opposite to the first side do not have the same width, and controlling the vehicle to travel such that the vehicle does not protrude to the second side opposite to the first side on which the vehicle travels and to then stop before the stop line such that the vehicle does not protrude to the second side when there is no oncoming vehicle a predetermined distance in front of the vehicle in the road in which a center line for partitioning traffic directions of vehicles is provided and a first side of the center line and a second side opposite to the first side have the same width.

(7) In the aspect of one of (1) to (6), further comprising: controlling the vehicle to travel based on whether a center line is provided in the road and a width of a lane on a first side of the center line and a width of a lane on a side opposite to the first side, and controlling the vehicle to travel based on a road marking marked on the road and then to stop such that the vehicle does not protrude in the width direction of the stop line.

(8) An aspect of the invention provides a vehicle control device including: a recognizer configured to recognize surrounding conditions of a vehicle; and a controller configured to control a speed and a steering of the vehicle based on the surrounding conditions of the vehicle recognized by the recognizer, wherein the controller is configured to control the vehicle to stop before a stop line recognized by the recognizer such that the vicinity of the center or the center in a width direction of the vehicle is aligned with the vicinity of the center or the center in a length direction of the stop line in a width direction of a road.

(9) An aspect of the invention provides a non-transitory computer readable storage medium that stores a program to be executed by a computer at least: recognize surrounding conditions of a vehicle; control a speed and a steering of the vehicle based on the recognized surrounding conditions of the vehicle; and controlling the vehicle to stop before a stop line such that the vicinity of a center or the center in a width direction of the vehicle is aligned with the vicinity of a center or the center in a length direction of the stop line in a width direction of a road.

According to the aspects of (1) to (9), the vehicle control device, the vehicle control method, or storage medium can realize control suitable for a traffic environment by controlling a vehicle to stop before a stop line such that the vicinity of the center or the center in the width direction of the vehicle is aligned with the vicinity of the center or the center in the length direction (longitudinal direction) of the stop line in a width direction of a road.

DETAILED DESCRIPTION

Hereinafter, a vehicle control method, a vehicle control device, and a storage medium according to an embodiment of the invention will be described with reference to the accompanying drawings.

Overall Configuration

Figure 1:
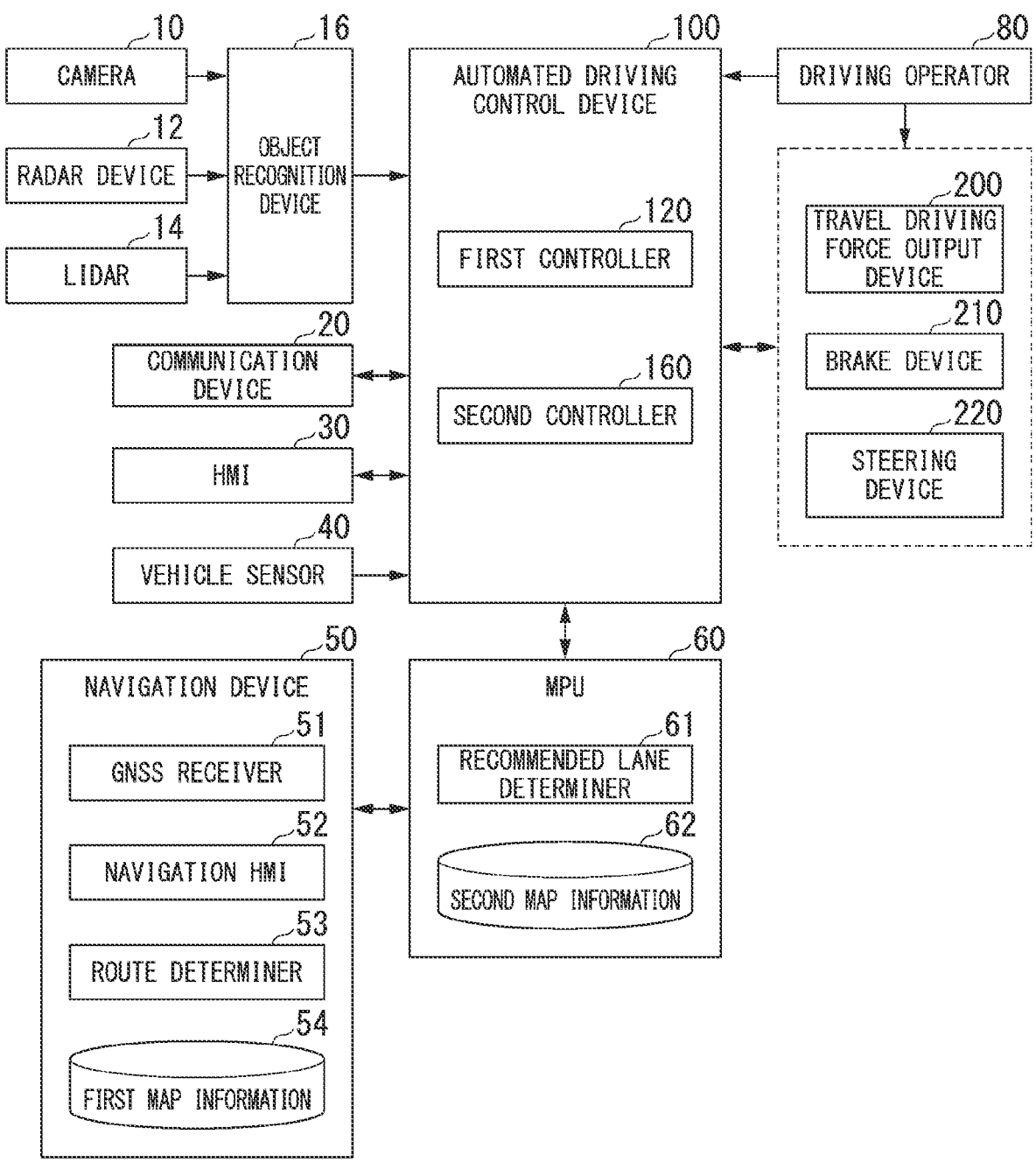
FIG. 1 is a diagram showing a configuration of a vehicle system employing a vehicle control device according to an embodiment.

FIG. 1 is a diagram showing a configuration of a vehicle system 1 employing a vehicle control device according to an embodiment. A vehicle in which the vehicle system 1 is mounted is, for example, a vehicle with two wheels, three wheels, or four wheels and a drive source thereof is an internal combustion engine such as a diesel engine or a gasoline engine, an electric motor, or a combination thereof. An electric motor operates using electric power which is generated by a power generator connected to the internal combustion engine or electric power which is discharged from a secondary battery or a fuel cell.

The vehicle system 1 includes, for example, a camera 10, a radar device 12, a Light Detection and Ranging (LIDAR) 14, an object recognition device 16, a communication device 20, a human-machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices or instruments are connected to each other via a multiplex communication line such as a controller area network (CAN) communication line, a serial communication line, a radio communication network, or the like. The configuration shown in FIG. 1 is only an example and a part of the configuration may be omitted or another configuration may be added thereto.

The camera 10 is, for example, a digital camera using a solid-state imaging device such as a charge coupled device (CCD) or a complementary metal oxide semiconductor (CMOS). The camera 10 is attached to an arbitrary position on a vehicle (hereinafter, referred to as a host vehicle M) in which the vehicle system 1 is mounted. When the front view of the vehicle is imaged, the camera 10 is attached to an upper part of a front windshield, a rear surface of a rearview mirror, or the like. The camera 10 images surroundings of the host vehicle M, for example, periodically and repeatedly. The camera 10 may be a stereoscopic camera.

The radar device 12 radiates radio waves such as millimeter waves to the surroundings of the host vehicle M, detects radio waves (reflected waves) reflected by an object, and detects at least a position (a distance and a direction) of the object. The radar device 12 is attached to an arbitrary position on the host vehicle M. The radar device 12 may detect the position and the speed of an object using a frequency modulated continuous wave (FM-CW) method.

The LIDAR 14 applies light (or electromagnetic waves of wavelengths close to light) to the surroundings of the host vehicle M and measures scattered light. The LIDAR 14 detects the distance to an object on the basis of a time from emission of light to reception of light. The light which is applied is, for example, a pulse-like laser beam. The LIDAR 14 is attached to an arbitrary position on the host vehicle M.

The object recognition device 16 performs a sensor fusion process on results of detection from some or all of the camera 10, the radar device 12, and the LIDAR 14 and recognizes a position, a type, a speed, and the like of an object. The object recognition device 16 outputs the result of recognition to the automated driving control device 100. The object recognition device 16 may output the results of detection from the camera 10, the radar device 12, and the LIDAR 14 to the automated driving control device 100 without any change. The object recognition device 16 may be omitted from the vehicle system 1.

The communication device 20 communicates with, for example, other vehicles near the host vehicle M using a cellular network, a Wi-Fi network, Bluetooth (registered trademark), or dedicated short range communication (DSRC) or communicates with various types of server devices via a radio base station.

The HMI 30 presents various types of information to an occupant of the host vehicle M and receives an input operation from the occupant. The HMI 30 includes various types of display devices, speakers, buzzers, a touch panel, switches, and keys.

The vehicle sensor 40 includes a vehicle speed sensor that detects the speed of the host vehicle M, an acceleration sensor that detects the acceleration, a yaw rate sensor that detects the angular velocity around a vertical axis, and a direction sensor that detects the direction of the host vehicle M.

The navigation device 50 includes, for example, a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies the position of the host vehicle M on the basis of signals received from GNSS satellites. The position of the host vehicle M may be identified or corrected by an inertial navigation system (INS) using the output of the vehicle sensor 40. The navigation HMI 52 includes a display device, a speaker, a touch panel, and keys. The whole or a part of the navigation HMI 52 may be shared by the HMI 30. For example, the route determiner 53 determines a route (hereinafter referred to as a route on a map) from the position of the host vehicle M identified by the GNSS receiver 51 (or an input arbitrary position) to a destination input by an occupant using the navigation HMI 52 with reference to the first map information 54. The first map information 54 is, for example, information in which road shapes are expressed by links indicating roads and nodes connected by the links. The first map information 54 may include curvatures of roads or point of interest (POI) information. The route on a map is output to the MPU 60. The navigation device 50 may perform guidance for a route using the navigation HMI 52 on the basis of the route on a map. The navigation device 50 may be realized, for example, by a function of a terminal device such as a smartphone or a tablet terminal which is carried by an occupant. The navigation device 50 may transmit a current position and a destination to a navigation server via the communication device 20 and acquire a route which is equivalent to the route on a map from the navigation server.

The MPU 60 includes, for example, a recommended lane determiner 61 and stores second map information 62 in a storage device such as an HDD or a flash memory. The recommended lane determiner 61 divides a route on a map supplied from the navigation device 50 into a plurality of blocks (for example, every 100 [m] in a vehicle travel direction) and determines a recommended lane for each block with reference to the second map information 62. The recommended lane determiner 61 determines in which lane from the leftmost the host vehicle is to travel. When there is a branching point in the route on a map, the recommended lane determiner 61 determines a recommended lane such that the host vehicle M can travel on a rational route for traveling to a branching destination.

The second map information 62 is map information with higher precision than that of the first map information 54. The second map information 62 includes, for example, information on the centers of lanes or information on boundaries of lanes. The second map information 62 may include road information, traffic regulation information, address information (addresses and postal codes), facility information, and phone number information. The second map information 62 may be updated from time to time by causing the communication device 20 to communicate with another device.

The driving operator 80 includes, for example, an accelerator pedal, a brake pedal, a shift lever, a steering wheel, a deformed steering wheel, a joystick, and other operators. A sensor that detects the amount of operation or performing of an operation is attached to the driving operator 80, and results of detection thereof are output to the automated driving control device 100, the travel driving force output device 200, and some or all of the brake device 210 and the steering device 220.

The automated driving control device 100 includes, for example, a first controller 120 and a second controller 160. The first controller 120 and the second controller 160 are realized, for example, by causing a hardware processor such as a central processing unit (CPU) to execute a program (software). Some or all of such elements may be realized in hardware (which includes circuitry) such as a large scale integration (LSI), an application-specific integrated circuit (ASIC), or a field-programmable gate array (FPGA), or a graphics processing unit (GPU) or may be realized in cooperation of software and hardware. The program may be stored in a storage device such as an HDD or a flash memory of the automated driving control device 100 in advance, or may be stored in a removable storage medium such as a DVD or a CD-ROM and be installed in the HDD or the flash memory of the automated driving control device 100 by attaching the removable storage medium (a non-transitory storage medium) to a drive device. The automated driving control device 100 is an example of a "vehicle control device."

Figure 2:
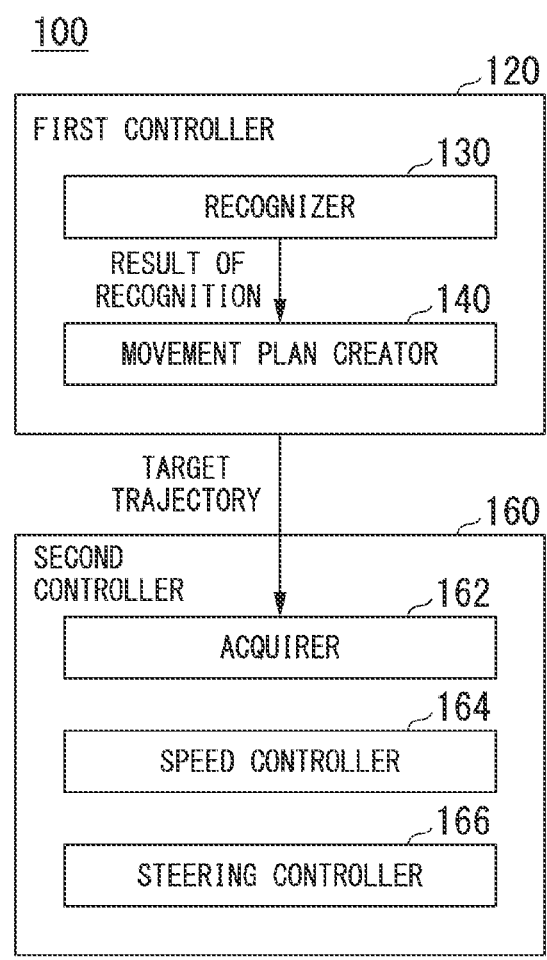
FIG. 2 is a diagram showing functional configurations of a first controller and a second controller.

FIG. 2 is a diagram showing functional configurations of the first controller 120 and the second controller 160. The first controller 120 includes, for example, a recognizer 130 and a movement plan creator 140. The first controller 120 is realized, for example, by performing a function based on artificial intelligence (AI) and a function based on a predetermined model together. For example, a function of "recognizing a crossing" may be realized by performing recognition of a crossing based on deep learning or the like and recognition based on predetermined conditions (such as signals and road signs which can be pattern-matched) together, scoring both recognitions, and comprehensively evaluating both recognitions. Accordingly, reliability of automated driving is secured.

The recognizer 130 recognizes states such as a position, a speed, and acceleration of an object near the host vehicle M on the basis of information input from the camera 10, the radar device 12, and the LIDAR 14 via the object recognition device 16. For example, a position of an object is recognized as a position in an absolute coordinate system with an origin set to a representative point of the host vehicle M (such as the center of gravity or the center of a drive shaft) and is used for control. A position of an object may be expressed as a representative point such as the center of gravity or a corner of the object or may be expressed as a drawn area. A "state" of an object may include an acceleration or a jerk of the object or a "moving state" (for example, whether lane change is being performed or whether lane change is going to be performed) thereof.

The recognizer 130 recognizes, for example, a lane in which the host vehicle M is traveling (a travel lane). For example, the recognizer 130 recognizes the travel lane by comparing a pattern of lane markings near the host vehicle M which are recognized from an image captured by the camera 10 with a pattern of lane markings (for example, arrangement of a solid line and a dotted line) which are acquired from the second map information 62. The recognizer 130 is not limited to the lane markings, and may recognize the travel lane by recognizing travel road boundaries (road boundaries) including lane markings, edges of roadsides, curbstones, medians, and guard rails. In this recognition, the position of the host vehicle M acquired from the navigation device 50 and the result of processing from the INS may be considered. The recognizer 130 recognizes a stop line, an obstacle, a red signal, a toll gate, or other road events.

The recognizer 130 recognizes a position or a direction of the host vehicle M with respect to a travel lane at the time of recognition of the travel lane. The recognizer 130 may recognize, for example, a distance of a reference point of the host vehicle M from a lane center and an angle of the travel direction of the host vehicle M with respect to a line formed by connecting the lane centers in the travel direction of the host vehicle M as the position and the direction of the host vehicle M relative to the travel lane. Instead, the recognizer 130 may recognize a position of the reference point of the host vehicle M relative to one side line of the travel lane (a lane marking or a road boundary) or the like as the position of the host vehicle M relative to the travel lane.

The movement plan creator 140 creates a target trajectory in which the host vehicle M will travel autonomously (without requiring a driver's operation) in the future such that the host vehicle M can travel in a recommended lane determined by the recommended lane determiner 61 in principle and cope with surrounding conditions of the host vehicle M. A target trajectory includes, for example, a speed element. For example, a target trajectory is expressed by sequentially arranging points (trajectory points) at which the host vehicle M is to arrive. Trajectory points are points at which the host vehicle M is to arrive at intervals of a predetermined traveling distance (for example, about several [m]) along a road, and a target speed and a target acceleration at intervals of a predetermined sampling time (for example, about below the decimal point [sec]) are created as a part of a target trajectory in addition. Trajectory points may be positions at which the host vehicle M is to arrive at intervals of a predetermined sampling time. In this case, information of the target speed or target acceleration is expressed by intervals between the trajectory points.

The movement plan creator 140 may set events of automated driving in creating a target trajectory. The events of automated driving include a constant-speed travel event, a low-speed following travel event, a lane change event, a branching event, a merging event, and a take-over event. The movement plan creator 140 creates a target trajectory based on events which are started.

The second controller 160 controls the travel driving force output device 200, the brake device 210, and the steering device 220 such that the host vehicle M travels along a target trajectory created by the movement plan creator 140 as scheduled.

The second controller 160 includes, for example, an acquirer 162, a speed controller 164, and a steering controller 166. The acquirer 162 acquires information of a target trajectory (trajectory points) created by the movement plan creator 140 and stores the acquired information in a memory (not shown). The speed controller 164 controls the travel driving force output device 200 or the brake device 210 on the basis of a speed element accessory to the target trajectories stored in the memory. The steering controller 166 controls the steering device 220 on the basis of curved states of the target trajectories stored in the memory. The processes of the speed controller 164 and the steering controller 166 are realized, for example, in combination of feed-forward control and feedback control. For example, the steering controller 166 performs control in combination of feed-forward control based on a curvature of a road in front of the host vehicle M and feedback control based on a distance from the target trajectory.

The travel driving force output device 200 outputs a travel driving force (a torque) for allowing the vehicle to travel to the driving wheels. The travel driving force output device 200 includes, for example, a combination of an internal combustion engine, an electric motor, and a transmission and an electronic control unit (ECU) that controls them. The ECU controls the aforementioned constituents on the basis of information input from the second controller 160 or information input from the driving operator 80.

The brake device 210 includes, for example, a brake caliper, a cylinder that transmits a hydraulic pressure to the brake caliper, an electric motor that generates a hydraulic pressure in the cylinder, and a brake ECU. The brake ECU controls the electric motor on the basis of the information input from the second controller 160 or the information input from the driving operator 80 such that a brake torque based on a braking operation is output to vehicle wheels. The brake device 210 may include a mechanism for transmitting a hydraulic pressure generated by an operation of a brake pedal included in the driving operator 80 to the cylinder via a master cylinder as a backup. The brake device 210 is not limited to the above-mentioned configuration, and may be an electronically controlled hydraulic brake device that controls an actuator on the basis of the information input from the second controller 160 such that the hydraulic pressure of the master cylinder is transmitted to the cylinder.

The steering device 220 includes, for example, a steering ECU and an electric motor. The electric motor changes a direction of turning wheels, for example, by applying a force to a rack-and-pinion mechanism. The steering ECU drives the electric motor on the basis of the information input from the second controller 160 or the information input from the driving operator 80 to change the direction of the turning wheels.

Vehicle Control in Relatively Narrow Road

The movement plan creator 140 causes a vehicle M to stop before a stop line on a specific road such that the vicinity of a center or the center in a width direction of the vehicle M is aligned with the vicinity of a center or the center in a length direction of the stop line in a width direction of the road. The specific road is a road in which a center line of the road is not provided, a road in which a center line is provided and a first width of a lane (hereinafter referred to as a host lane or a first side) in which the vehicle M is traveling and a second width of a lane (hereinafter referred to as an opposite lane or a second side) in which an oncoming vehicle is traveling are different from each other, or the like. For example, the second width may be greater than the first width.

Figure 3:
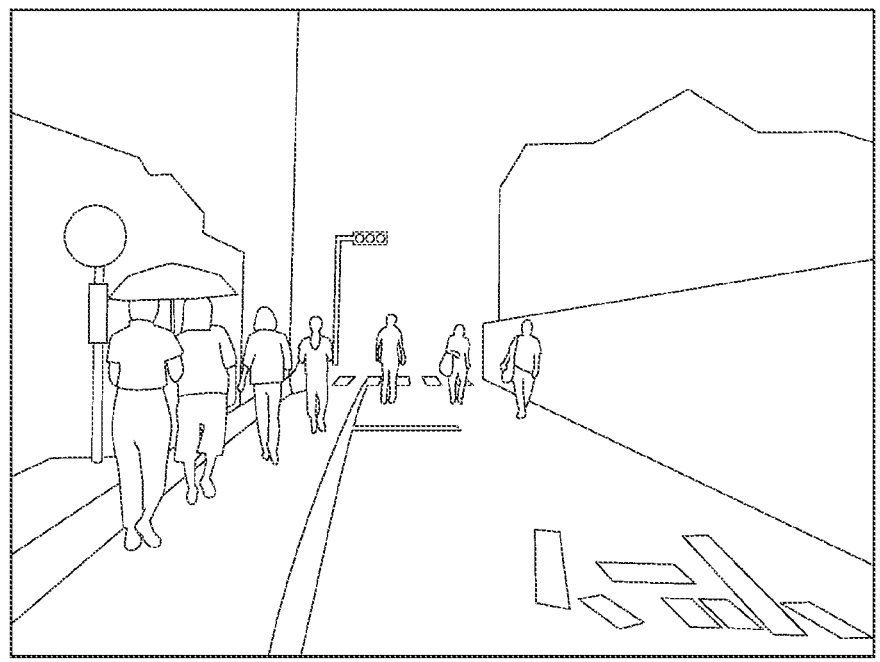
FIG. 3 is a diagram showing an example of a specific road.
Figure 4:
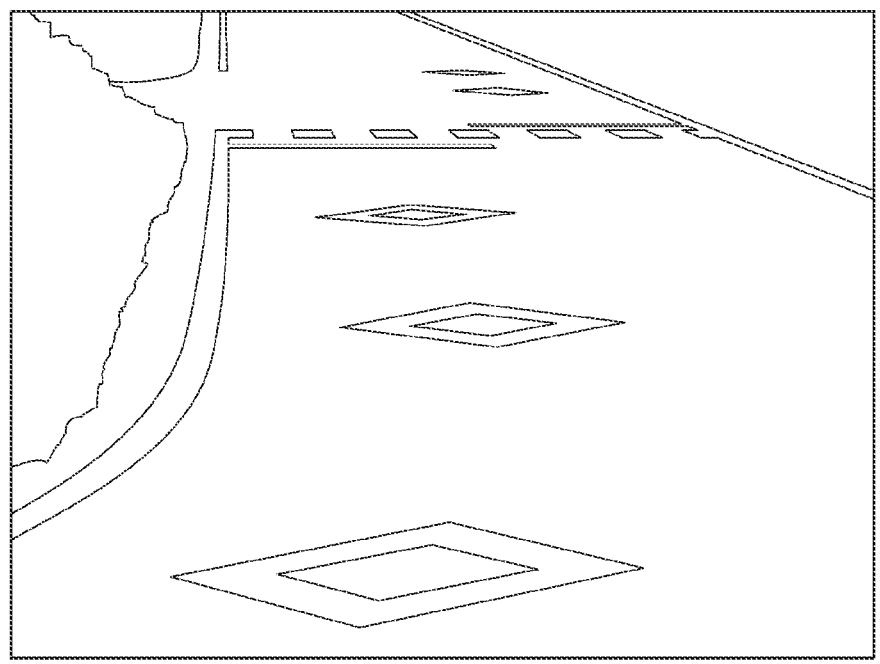
FIG. 4 is a diagram showing another example of a specific road.

Specifically, the specific road may be the aforementioned road in which a pedestrian crossing is provided and a stop line is provided before the pedestrian crossing (see FIG. 3). The specific road may be the aforementioned road in which a pedestrian crossing is provided, a stop line is provided before the pedestrian crossing, and a road marking is provided before the pedestrian crossing (see FIG. 4). The road marking is, for example, a marking indicating that a pedestrian crossing or a bicycle crossing is provided. The road marking may be a "STOP" marking which is marked before a stop line.

Movement (1) of Vehicle in Specific Road

Figure 5:
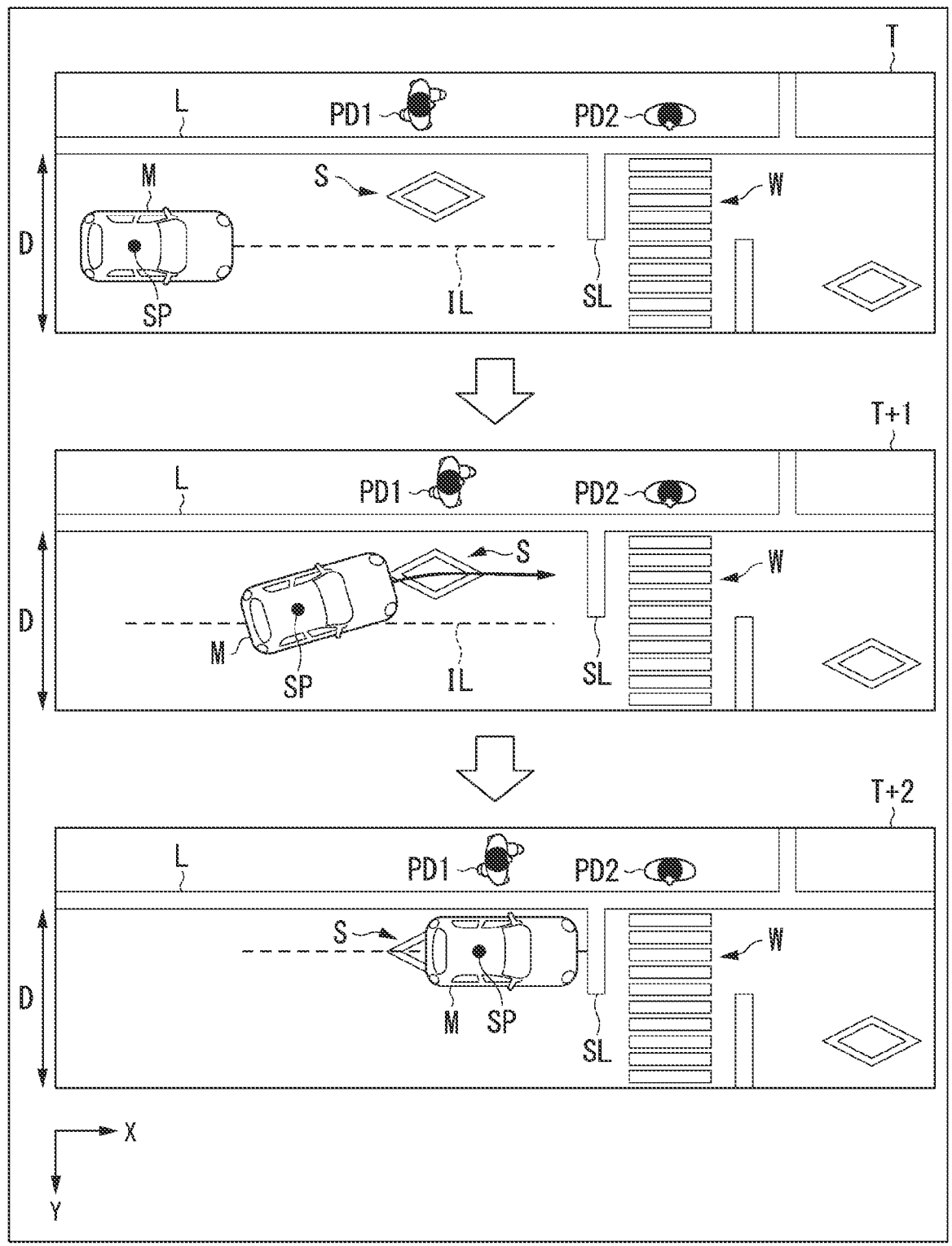
FIG. 5 is a diagram showing an example of movement of a vehicle in a specific road.

FIG. 5 is a diagram showing an example of movement of a vehicle M in a specific road. In the road shown in FIG. 5, a roadway and a walkway are partitioned by a lane marking L. A width D of the roadway is double a width of the vehicle M. The width D of the roadway has such a value in which a vehicle M traveling in a +X direction and an oncoming vehicle traveling in a −X direction can pass each other at low speeds. The width D is an example of a "predetermined width." In this embodiment, it is assumed that the vehicle M travels on the left side of the roadway and the oncoming vehicle travels on the right side of the roadway. The left side of the roadway is a −Y side (the first side) of the roadway, and the right side of the roadway is a +Y side (the second side) of the roadway. When the vehicle M is traveling on the second side and the oncoming vehicle is traveling on the first side, a process of interchanging the first side and the second side in the following processes can be performed.

On the first side in front of the vehicle M, a road making S, a stop line SL, and a pedestrian crossing W are sequentially marked. A walkway is provided on the first side. A pedestrian PD1 is present in the walkway on the −Y side of the road marking S, and the pedestrian PD1 walks in the +X direction. A pedestrian PD2 is present in the walkway on the −Y side of the pedestrian crossing W, and the pedestrian PD2 is about to cross the pedestrian crossing W.

At time T, in a first situation, the movement plan creator 140 causes the vehicle M to travel such that a reference position (a center axis) of the vehicle M is aligned with the vicinity of the center or the center of the roadway. The first situation is a situation in which an oncoming vehicle m is not present in front of the vehicle M within a predetermined distance (for example, several tens of meters) from the vehicle M. For example, the movement plan creator 140 causes the vehicle M to travel such that the reference position SP of the vehicle M is aligned with a generated imaginary line IL. The imaginary line IL is a line indicating the center in the width direction of the road (the roadway).

At time T+1, the movement plan creator 140 causes the vehicle M to stop before the stop line SL because the pedestrian PD2 is present. In this case, the movement plan creator 140 controls the vehicle M such that the vicinity of the center or the center of the road marking S is aligned with the reference position SP of the vehicle M in the Y direction. Accordingly, the vehicle M moves to the first side from the vicinity of the center or the center of the road.

At time T+2, the movement plan creator 140 controls the vehicle M such that the vehicle M travels over the road marking S and causes the vehicle M to stop before the stop line SL. For example, the vehicle M travels such that the reference position SP of the vehicle M is aligned with vicinity of the center or the center of the road marking S in the Y direction, and stops such that the vehicle does not protrude in the +Y direction from the stop line SL. The vehicle M stops before the stop line SL such that it does not hinder traveling of an oncoming vehicle which travels in an area on the second side opposite to the first side on which the vehicle M travels. After the pedestrian PD2 has crossed the pedestrian crossing W, the vehicle M starts.

In this way, the vehicle M travels in the vicinity of the center or the center of the road when there is no oncoming vehicle, and travels over vicinity of the center or the center of the road marking S and stops on the first side when the vehicle M approaches the stop line. Accordingly, when an oncoming vehicle approaches after the vehicle M has stopped, it is possible to curb traveling of the oncoming vehicle being hindered. Even when a pedestrian suddenly approaches the roadway, the vehicle M can keep an appropriate distance from the pedestrian. As a result, it is possible to realize control suitable for a traffic environment.

Movement (2) of Vehicle in Specific Road

Figure 6:
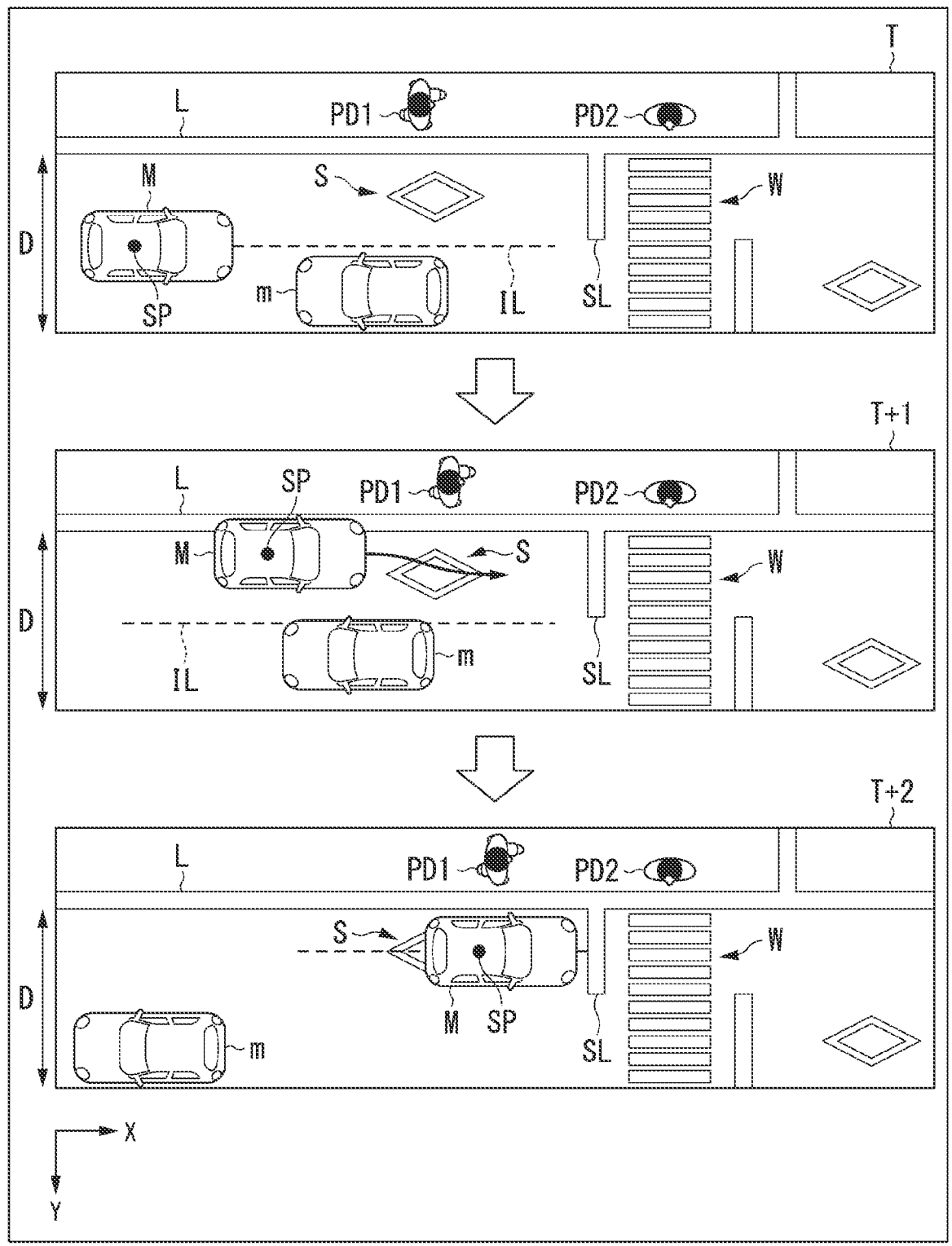
FIG. 6 is a diagram showing another example of movement of a vehicle in a specific road.

FIG. 6 is a diagram showing another example of movement of a vehicle M in a specific road. Differences from description with reference to FIG. 5 will be mainly described below. In the example shown in FIG. 6, an oncoming vehicle m travels on the second side and approaches the vehicle M when the vehicle M is traveling in the vicinity of the center or the center of the roadway.

At time T, when the vehicle M is traveling in the vicinity of the center or the center of the roadway, an oncoming vehicle M approaches. At time T+1, the movement plan creator 140 causes the vehicle M to move to the first side such that the vehicle M avoids the oncoming vehicle m. At this time, the movement plan creator 140 causes the vehicle M to move to a position at which the oncoming vehicle M can travel smoothly on the basis of the width of the vehicle M, the width of the oncoming vehicle m, and the width of the road. For example, the vehicle M moves onto the marking line L or to a position at which the vehicle M protrudes in the −Y direction from the lane marking L. At this time, the vehicle M travels such that walking of a pedestrian PD1 on the walkway is not hindered. For example, when the vehicle M and the pedestrian PD1 overlap at a position in the Y direction, the vehicle M travels at a walking speed of the pedestrian PD1 a predetermined distance before the pedestrian PD1.

Accordingly, since a distance in the width direction between the vehicle M and the oncoming vehicle m increases, the oncoming vehicle m can travel smoothly. The vehicle M hindering the pedestrian PD1 can be curbed.

At time T+2, after the vehicle M and the oncoming vehicle m have passed each other, the movement plan creator 140 controls the vehicle M such that the vehicle M travels over the road marking S (over the center in the Y direction of the road marking S) and causes the vehicle M to stop before the stop line SL. After the pedestrian PD2 has crossed the pedestrian crossing W, the vehicle M starts.

In this way, the vehicle M travels on the first side such that the oncoming vehicle m can travel smoothly when the oncoming vehicle m is present, and stops on the first side when the vehicle M approaches the stop line. Even when a pedestrian suddenly approaches the roadway, the vehicle M can keep an appropriate distance from the pedestrian. As a result, it is possible to realize control suitable for a traffic environment.

Movement (3) of Vehicle in Specific Road

Figure 7:
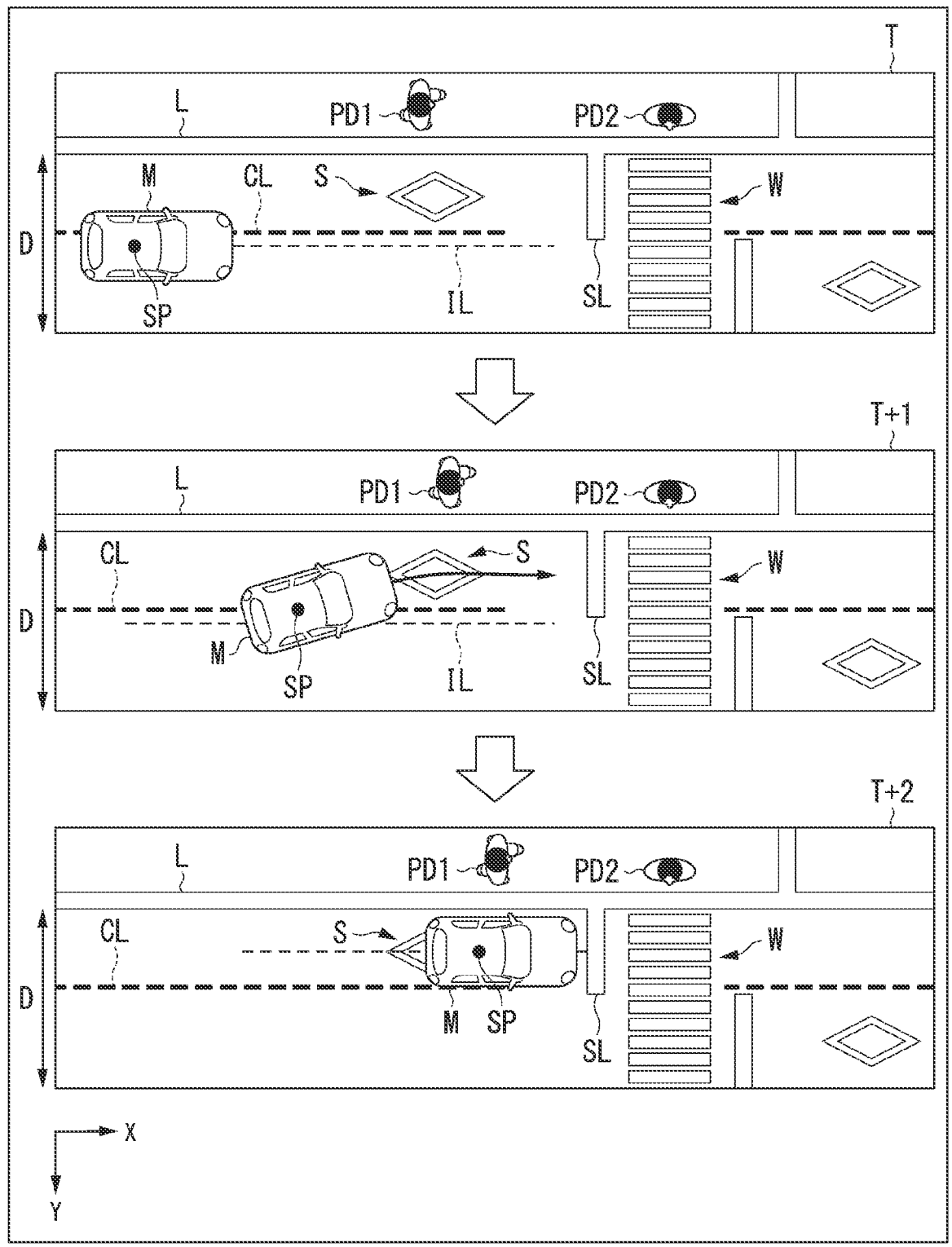
FIG. 7 is a diagram showing another example of movement of a vehicle in a specific road.

FIG. 7 is a diagram showing another example of movement of a vehicle M in a specific road. Differences from description with reference to FIG. 5 will be mainly described below. In the example shown in FIG. 7, a center line CL is marked on the roadway. The center line CL is provided further on the −Y side from the center of the roadway. That is, a width of the roadway on the first side (a first lane) with respect to the center line CL is less than a width of the roadway on the second side (a second lane) with respect to the center line CL.

At time T, in the first situation, the movement plan creator 140 causes the vehicle M to travel such that the reference position (the center axis) of the vehicle M is aligned with the vicinity of the center or the center of the roadway.

At time T+1, the movement plan creator 140 controls the vehicle M such that the vicinity of the center or the center in the Y direction of the road marking S is aligned with the reference position SP of the vehicle M. Accordingly, the vehicle M moves to the first side from the vicinity of the center or the center of the road.

At time T+2, the movement plan creator 140 controls the vehicle M such that the vehicle M travels over the road marking S, and causes the vehicle M to stop before the stop line SL. For example, the vehicle M stops such that it does not protrude in the +Y direction from the stop line SL. After a pedestrian PD2 has crossed the pedestrian crossing W, the vehicle M starts.

In this way, the vehicle M travels in the vicinity of the center or the center of the road when the width of the first lane is less than the width of the second lane, and stops in the first lane when the vehicle M approaches the stop line. Accordingly, even when an oncoming vehicle approaches after the vehicle M has stopped, it is possible to curb traveling of the oncoming vehicle from being hindered. As a result, it is possible to realize control suitable for a traffic environment.

Movement (4) of Vehicle in Specific Road

Figure 8:
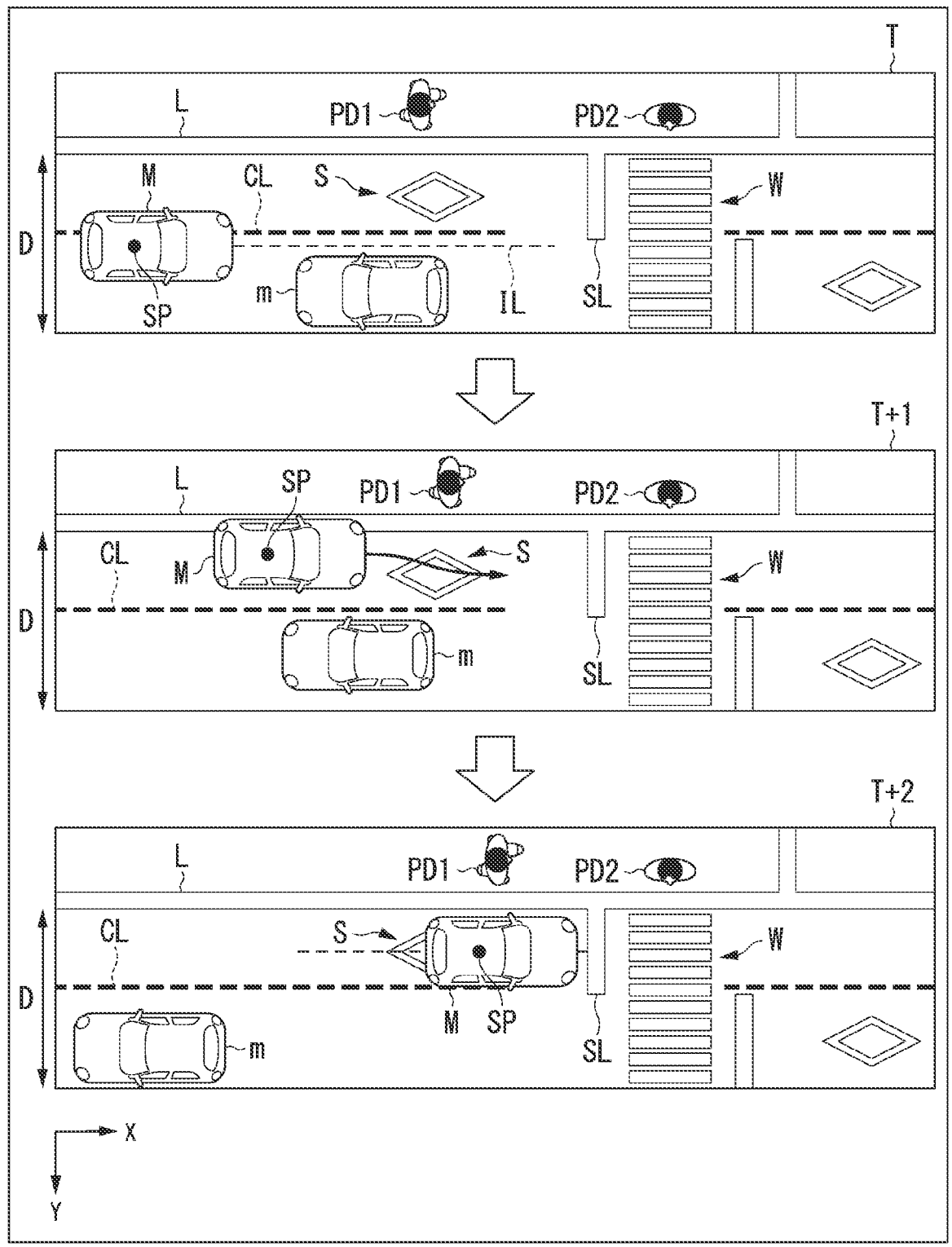
FIG. 8 is a diagram showing another example of movement of a vehicle in a specific road.

FIG. 8 is a diagram showing another example of movement of a vehicle M in a specific road. Differences from description with reference to FIG. 7 will be mainly described below. In the example shown in FIG. 8, an oncoming vehicle m travels in the second lane L2 and approaches the vehicle M when the vehicle M is traveling in the vicinity of the center or the center of the roadway.

At time T, the vehicle M travels in the vicinity of the center or the center of the roadway, and an oncoming vehicle M approaches. At time T+1, the movement plan creator 140 causes the vehicle M to move to the first side such that the vehicle M avoids the oncoming vehicle m. At this time, the movement plan creator 140 causes the vehicle M to move to a position at which the oncoming vehicle M can travel smoothly on the basis of the width of the vehicle M, the width of the oncoming vehicle m, and the width of the road. For example, the vehicle M moves onto the marking line L or to a position at which the vehicle M protrudes in the −Y direction from the lane marking L. At this time, the vehicle M travels such that walking of a pedestrian PD1 on the walkway is not hindered.

At time T+2, after the vehicle M and the oncoming vehicle m have passed each other, the movement plan creator 140 controls the vehicle M such that the vehicle M travels over the road marking S (over the center in the Y direction of the road marking S) and causes the vehicle M to stop before the stop line SL. After the pedestrian PD2 has crossed the pedestrian crossing W, the vehicle M starts.

In this way, the vehicle M travels on the first side such that the oncoming vehicle m can travel smoothly when the oncoming vehicle m is present, and stops on the first side when the vehicle M approaches the stop line. As a result, it is possible to realize control suitable for a traffic environment.

Flowchart (1)

Figure 9:
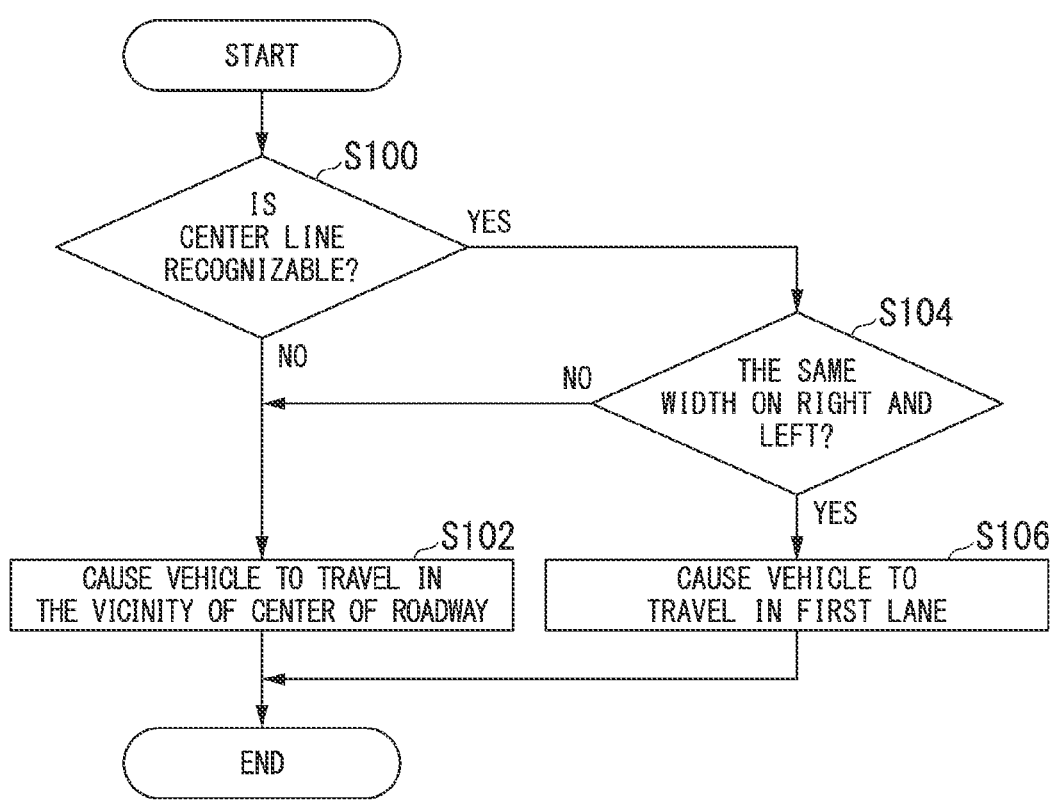
FIG. 9 is a flowchart showing an example of a flow of processes which are performed by an automated driving control device.

FIG. 9 is a flowchart showing an example of a flow of processes which are performed by the automated driving control device 100. In this flow of processes, it is assumed that a road has a predetermined width or less and there is no oncoming vehicle on the road.

First, it is determined whether the recognizer 130 has recognized a center line of the road (Step S100). When the center line of the road has not been recognized, the movement plan creator 140 causes the vehicle M to travel in the vicinity of the center (or the center) of the roadway (Step S102). Details of the process of Step S102 will be described later with reference to FIG. 10.

When the center line of the road has been recognized, the movement plan creator 140 determines whether the width of a first lane and the width of a second lane are equal to each other on the basis of the result of recognition from the recognizer 130 (Step S104). When the width of the first lane and the width of the second lane are not equal to each other, the flow of processes proceeds to the process of Step S102. When the width of the first lane and the width of the second lane are equal to each other, the movement plan creator 140 causes the vehicle M to travel in the first lane (Step S106). For example, the vehicle M travels such that it does not protrude from the first lane. Then, the flow of processes in the flowchart ends.

Flowchart (2)

Figure 10:
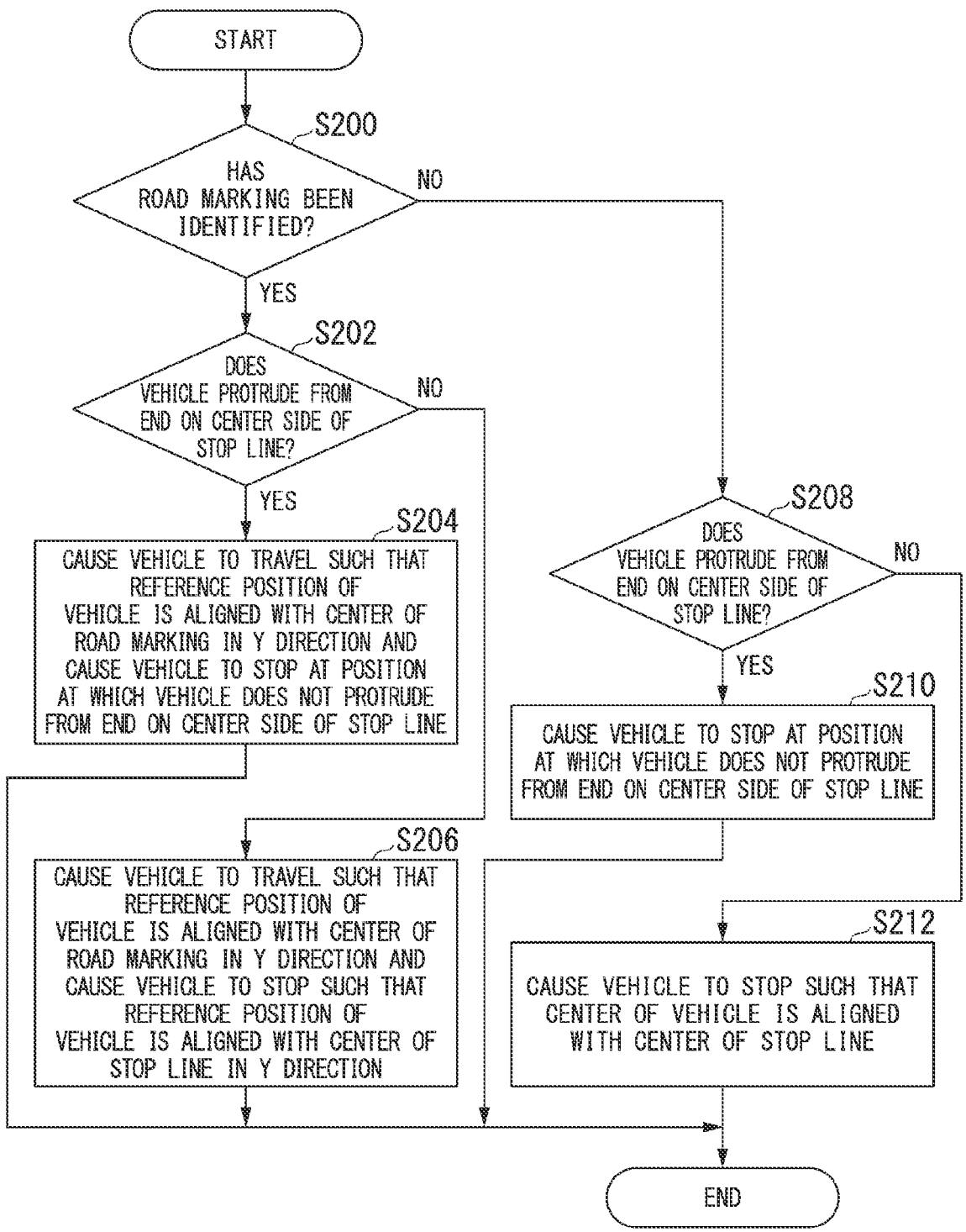
FIG. 10 is a flowchart showing another example of a flow of processes which are performed by the automated driving control device.

FIG. 10 is a flowchart showing another example of the flow of processes which are performed by the automated driving control device 100. This flow of processes is an example in the process of Step S102 when the vehicle M stops before the stop line.

First, it is determined whether the recognizer 130 has recognized a road marking (Step S200). When a road marking has been recognized, the movement plan creator 140 determines whether the vehicle M protrudes from an end on the central side of the stop line when the reference position of the vehicle M is aligned with the center (or vicinity of the center) in the length direction of the stop line in the Y direction (Step S202).

When it is determined in the process of Step S202 that the vehicle M protrudes from the end on the central side of the stop line, the movement plan creator 140 causes the vehicle M to travel such that the reference position of the vehicle is aligned with the center (or vicinity of the center) of the road marking in the Y direction, and causes the vehicle M to stop at a position at which the vehicle does not protrude from the end on the central side of the stop line in the Y direction (Step S204).

When it is determined in the process of Step S202 that the vehicle M does not protrude from the end on the central side of the stop line, the movement plan creator 140 causes the vehicle M to travel such that the reference position of the vehicle is aligned with the center of the road marking in the Y direction, and causes the vehicle M to stop such that the reference position of the vehicle M is aligned with the center (or vicinity of the center) of the stop line in the Y direction (Step S206).

When a road marking has not been recognized, the movement plan creator 140 determines whether the vehicle M protrudes from the end on the central side of the stop line when the reference position of the vehicle M is aligned with the center (or vicinity of the center) in the length direction of the stop line in the Y direction (Step S208).

When it is determined in the process of Step S208 that the vehicle M protrudes from the end on the central side of the stop line, the movement plan creator 140 causes the vehicle M to stop at a position at which the vehicle does not protrude from the end on the central side of the stop line in the Y direction (Step S210).

When it is determined in the process of Step S208 that the vehicle M does not protrude from the end on the central side of the stop line, the movement plan creator 140 causes the vehicle M to stop such that the reference position of the vehicle M is aligned with the center (or vicinity of the center) of the stop line in the Y direction (Step S212). Accordingly, the processes of one routine of the flowchart ends.

As described above, by causing the movement plan creator 140 to control the vehicle M on the basis of whether there is a center line, a degree of equality between the first lane and the second lane, whether there is a road marking, and the relationship between the length of the stop line and the width of the vehicle M, it is possible to realize control suitable for a traffic environment.

Movement (5) of Vehicle in Specific Road

Figure 11:
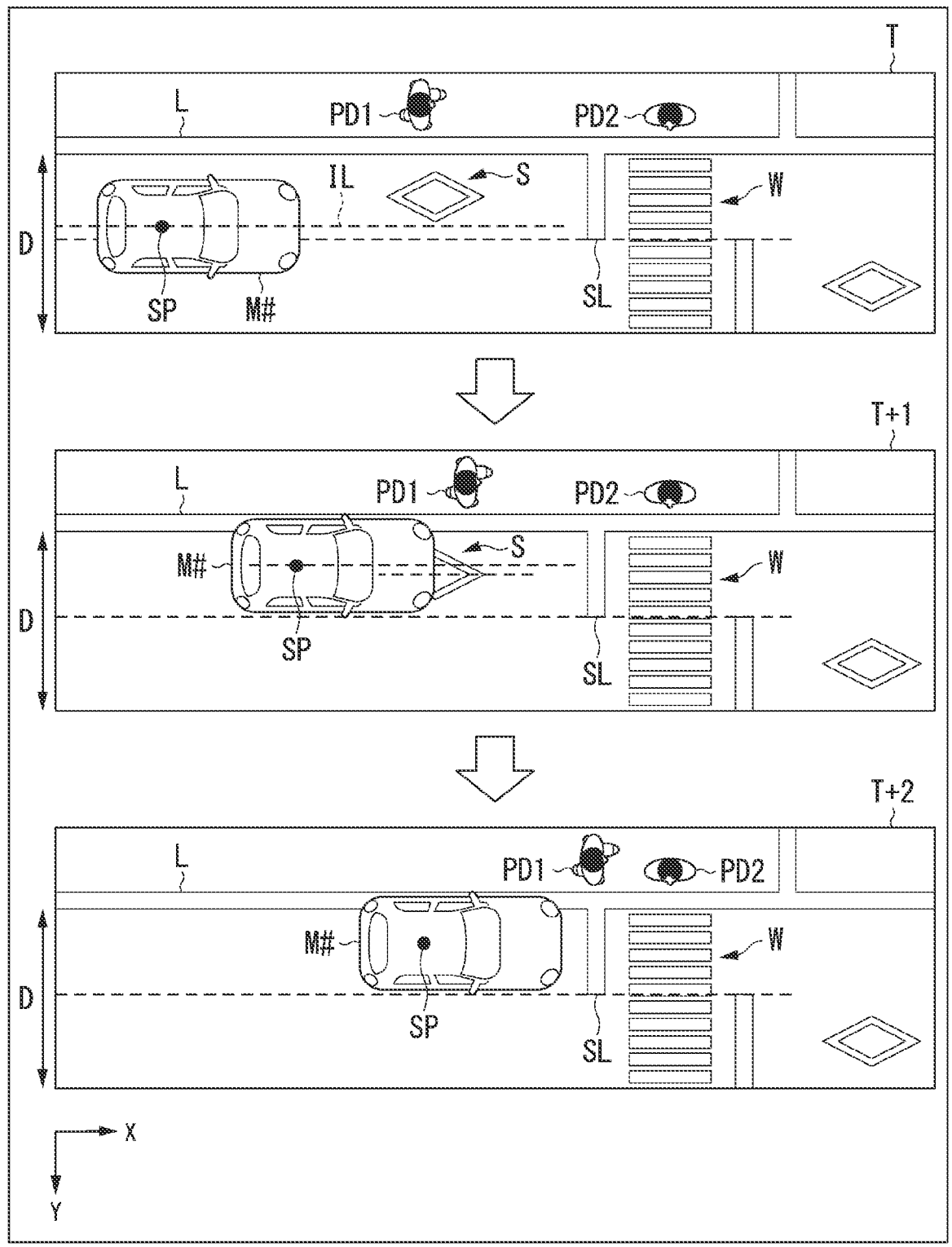
FIG. 11 is a diagram showing another example of movement of a vehicle in a specific road.

FIG. 11 is a diagram showing another example of movement of a vehicle M in a specific road. Differences from description with reference to FIG. 5 will be mainly described below. In the example shown in FIG. 11, a vehicle M# which is larger than the vehicle M stops before the stop line. The vehicle M# is a vehicle of which the width in the Y direction is greater than the length of the stop line. This flow of processes is a routine which is performed when there is no oncoming vehicle, one road marking is marked before the stop line SL, and the recognizer 130 can recognize an end of the stop line SL on the central side of the road when the vehicle M# is located at a position distant by a predetermined distance from the stop line SL.

At time T, in the first situation, the movement plan creator 140 causes the vehicle M# to travel such that the reference position (the center axis) of the vehicle M# is aligned with the vicinity of the center (or the center) of the roadway.

At time T+1, the movement plan creator 140 causes the vehicle M# to travel such that the vehicle M# does not protrude from the stop line SL in the Y direction. In this case, the vehicle M# travels over the lane marking L or to protrude from the lane marking L, and travels such that walking of a pedestrian PD1 who walks on the walkway is not hindered.

At time T+2, the movement plan creator 140 causes the vehicle M# to stop before the stop line SL. For example, the vehicle M# stops such that it does not protrude in the +Y direction from the stop line SL. After a pedestrian PD2 has crossed the pedestrian crossing W, the vehicle M# starts.

In this way, the vehicle M# travels in the vicinity of the center (or the center) of the road, and stops such that it does not protrude from the stop line SL when the vehicle M# approaches the stop line. Accordingly, even when an oncoming vehicle approaches after the vehicle M# has stopped, it is possible to curb traveling of the oncoming vehicle from being hindered. As a result, it is possible to realize control suitable for a traffic environment.

Movement (6) of Vehicle in Specific Road

Figure 12:
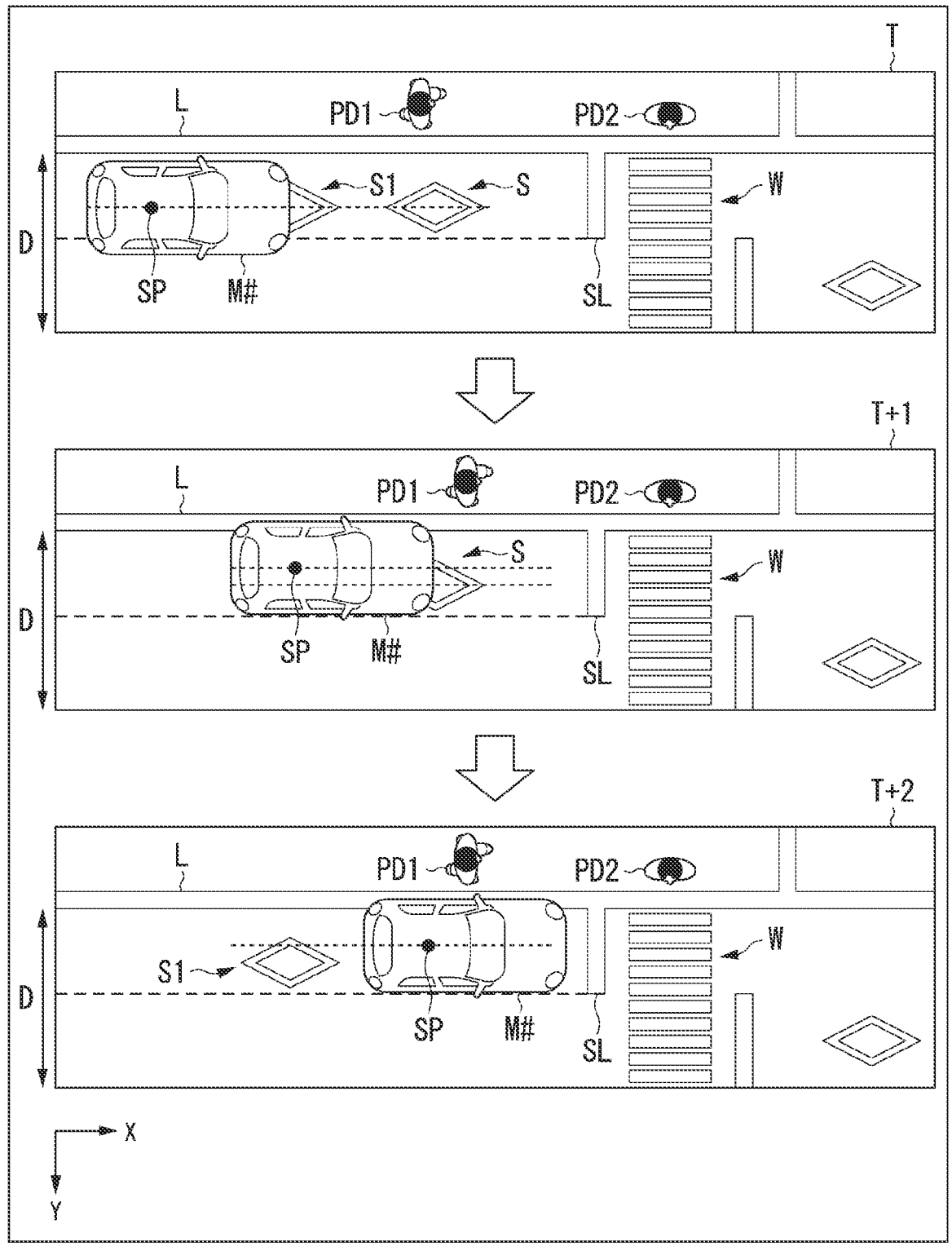
FIG. 12 is a diagram showing another example of movement of a vehicle in a specific road.

FIG. 12 is a diagram showing another example of movement of a vehicle M in a specific road. Differences from description with reference to FIG. 11 will be mainly described below. This flow of processes is a routine which is performed when there is no oncoming vehicle, a plurality of road markings are marked before the stop line SL, and the recognizer 130 cannot recognize an end of the stop line SL on the central side of the road when the vehicle M# is located at a position distant by a predetermined distance from the stop line SL.

At time T, when the vehicle M# travels in the vicinity of the center (or the center) of the road and there are a plurality of road markings on the road, the movement plan creator 140 causes the vehicle M# to travel such that the reference position SP of the vehicle M# is aligned with the vicinity of the center (or the center) of the road markings S in the Y direction. The plurality of road markings S are arranged in the X direction on the first side of the road.

At time T+1, the movement plan creator 140 causes the vehicle M# to travel such that the reference position SP of the vehicle M# is aligned with the vicinity of the center (or the center) of the road markings S in the Y direction, and the movement plan creator 140 causes the vehicle M# to travel such that the vehicle M# does not protrude from the stop line SL in the Y direction when the recognizer 130 can recognize the end of the stop line SL on the central side of the road. In the example shown in FIG. 12, when the recognizer 130 has recognized the end of the stop line SL as described above, the vehicle M# can travel such that it does not protrude from the stop line SL in the Y direction.

At time T+2, the movement plan creator 140 causes the vehicle M# to stop before the stop line SL. Accordingly, the vehicle M# stops such that it does not protrude in the +Y direction from the stop line SL. After a pedestrian PD2 has crossed the pedestrian crossing W, the vehicle M# starts.

In this way, the vehicle M# stops such that it does not protrude from the stop line SL. Accordingly, even when an oncoming vehicle approaches after the vehicle M# has stopped, it is possible to curb traveling of the oncoming vehicle from being hindered. As a result, it is possible to realize control suitable for a traffic environment.

When the vehicle M# is traveling and an oncoming vehicle m approaches, the vehicle M# moves to the first side and travels such that the oncoming vehicle m can travel smoothly as described above with reference to FIG. 8. The processes which are performed by the vehicle M# may be performed by the vehicle M instead of the vehicle M#.

Flowchart (3)

Figure 13:
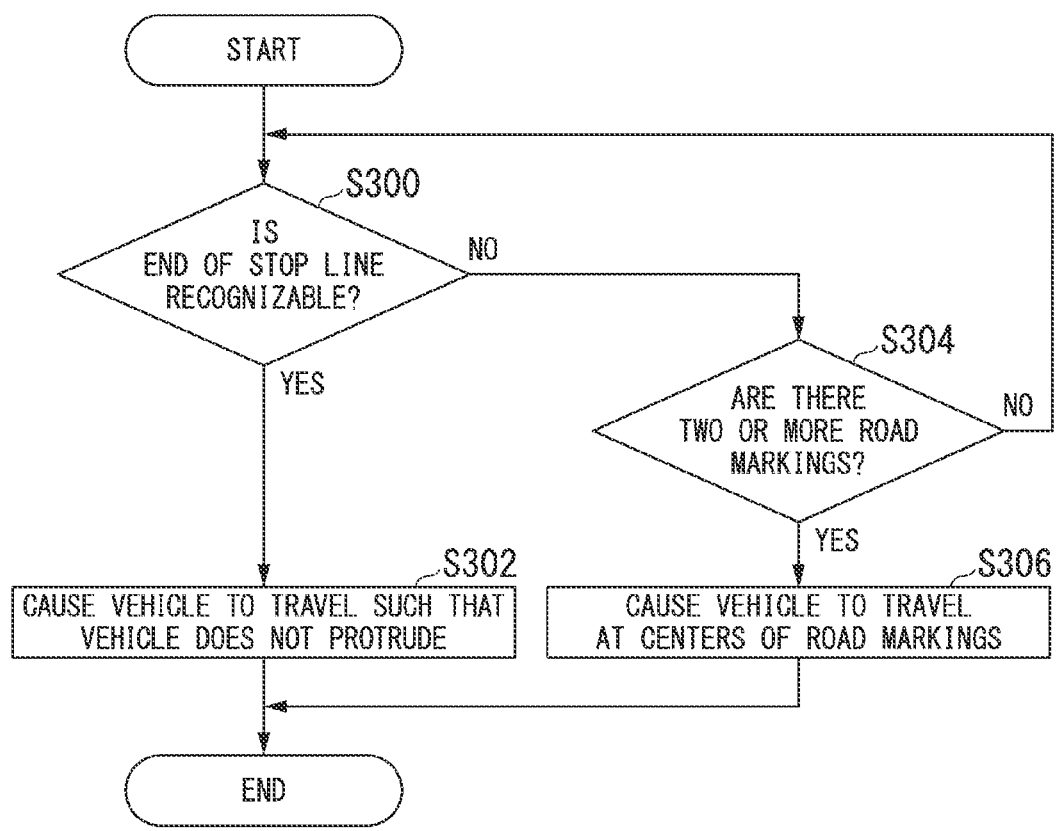
FIG. 13 is a flowchart showing another example of a flow of processes which are performed by the automated driving control device.

FIG. 13 is a flowchart showing another example of the flow of processes which are performed by the automated driving control device 100. This flow of processes is a routine which is performed when the vehicle M# (or the vehicle M) arrives at a position a predetermined distance before a stop line.

First, it is determined whether the recognizer 130 has recognized a stop line on the front side and an end of the stop line on the central side of the roadway (Step S300). When the stop line and the end of the stop line have been recognized, the movement plan creator 140 controls the vehicle M# such that the vehicle M# does not protrude from the end of the stop line (Step S302).

When the stop line and the end of the stop line have not been recognized, the movement plan creator 140 determines whether a plurality of road markings are marked on the basis of the result of recognition from the recognizer 130 (Step S304). When a plurality of road markings are not marked, the flow of processes returns to the process of Step S300.

When a plurality of road markings are marked, the movement plan creator 140 controls the vehicle M# such that the vehicle M# travels over the center (or vicinity of the center) of the road markings in the Y direction (Step S306). Accordingly, the processes of one routine of the flowchart end.

As described above, it is possible to realize control suitable for a traffic environment by controlling the vehicle M# on the basis of surrounding conditions of the vehicle M# and the results of recognition from the recognizer 130.

According to the aforementioned embodiment, the automated driving control device 100 can cause a vehicle M to stop before a stop line such that the vicinity of the center (or the center) in the width direction of the vehicle M is aligned with the vicinity of the center (or the center) in the length direction of the stop line in a width direction of a road, thereby realizing control suitable for a traffic environment.

Hardware Configuration

Figure 14:
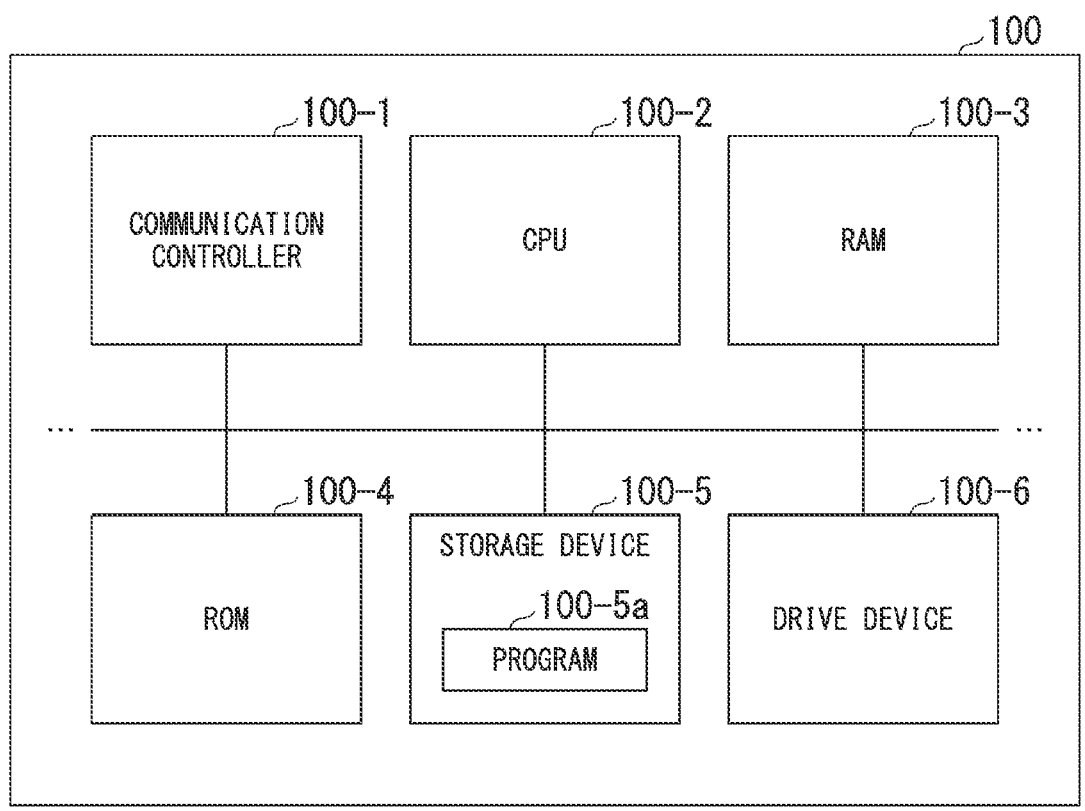
FIG. 14 is a diagram showing an example of a hardware configuration of the automated driving control device according to the embodiment.

FIG. 14 is a diagram showing an example of a hardware configuration of the automated driving control device 100 according to the embodiment. As shown in the drawing, the automated driving control device 100 has a configuration in which a communication controller 100-1, a CPU 100-2, a random access memory (RAM) 100-3 which is used as a work memory, a read only memory (ROM) 100-4 that stores a booting program or the like, a storage device 100-5 such as a flash memory or a hard disk drive (HDD), a drive device 100-6, and the like are connected to each other via an internal bus or a dedicated communication line. The communication controller 100-1 communicates with elements other than the automated driving control device 100. A program 100-5*a* which is executed by the CPU 100-2 is stored in the storage device 100-5. This program is loaded to the RAM 100-3 by a direct memory access (DMA) controller (not shown) or the like and is executed by the CPU 100-2. Accordingly, the first controller 120, the second controller 160, and some or all of the functional units included therein are realized.

The aforementioned embodiment can be expressed as follows: a vehicle control device including:
  a storage device that stores a program; and
  a hardware processor,
  wherein the hardware processor executes the program stored in the storage device to perform:
    recognizing surrounding conditions of a vehicle;

controlling a speed and a steering of the vehicle based on the recognized surrounding conditions of the vehicle; and controlling the vehicle to stop before the stop line such that the vicinity of the center or center in the width direction of the vehicle is aligned with the vicinity of the center in a length direction of the stop line in a width direction of a road.

While the invention has been described with reference to embodiments, the invention is not limited to the embodiments and can be subjected to various modifications and substitutions without departing from the gist of the invention.

What is claimed is:

1. A vehicle control method comprising:
   recognizing surrounding conditions of a vehicle;
   controlling a speed and a steering of the vehicle based on the recognized surrounding conditions of the vehicle;
   controlling the vehicle to stop before a stop line such that the vicinity of a center or the center in a width direction of the vehicle is aligned with the vicinity of a center or the center in a length direction of the stop line in a width direction of a road;
   based on the vehicle traveling in a roadway of a road, the road is a road in which the roadway and a walkway are partitioned, a width of the road is a width in which the vehicle and an oncoming vehicle can pass each other at low speeds and cannot pass each other at high speeds, determining whether it is possible to recognize a center line of the roadway of the road or not when recognizing a stop line in front of the vehicle, a presence of a pedestrian, and there is no oncoming vehicle, wherein the presence of the pedestrian comprises at least one of: a pedestrian crossing on a far side of the stop line, a pedestrian walking on the pedestrian crossing, and a pedestrian about to walk on the pedestrian crossing;
   based on it not being possible to recognize the center line, controlling the vehicle to travel such that (i) a vicinity of the center or the center of a width direction of the vehicle is aligned with the vicinity of the center or the center in the width direction of the road and to then stop before the stop line such that the vicinity of the center or the center in the width direction of the vehicle is aligned with the vicinity of the center or the center in the length direction of the stop line in the width direction of the road;
   based on it being possible to recognize the center line, determining whether a first side of the center line and a second side opposite to the first side are a same width or not;
   based on the first side and the second side being determined to not be the same width, controlling the vehicle to (ii) travel in the vicinity of the center or the center in the width direction of the road and to then stop before the stop line such that the vicinity of the center or the center in the width direction of the vehicle is aligned with the vicinity of the center or the center in the length direction of the stop line in the width direction of the road; and
   based on the first side and the second side being determined to be the same width, controlling the vehicle to travel such that (iii) the vehicle does not protrude to the second side opposite to the first side on which the vehicle travels and to then stop before the stop line such that the vehicle does not protrude to the second side.

2. The vehicle control method according to claim 1, further comprising:
   recognizing a road marking which is present before the stop line, and
   controlling the vehicle to travel such that the vicinity of the center or the center of the width direction of the vehicle is aligned with the vicinity of the center or the center in the width direction of the road of the road marking in the width direction of the road.

3. The vehicle control method according to claim 1, further comprising:
   controlling the vehicle to stop before the stop line such that the vehicle does not hinder traveling of the oncoming vehicle and the oncoming vehicle travels in an area on a second side opposite to a first side on which the vehicle travels.

4. The vehicle control method according to claim 1, further comprising:
   controlling the vehicle to stop before the stop line such that the vehicle does not protrude from the stop line in the width direction of the road.

5. The vehicle control method according to claim 1, further comprising:
   controlling the vehicle to travel in the vicinity of the center or the center in the width direction of the road and to then stop before the stop line such that the vicinity of the center or the center in the width direction of the vehicle is aligned with the vicinity of the center or the center in the length direction of the stop line in the width direction of the road when there is no oncoming vehicle a predetermined distance in front of the vehicle in the road in which a center line for partitioning traffic directions of vehicles is not provided and which has a predetermined width or less.

6. The vehicle control method according to claim 1, further comprising:
   controlling the vehicle to travel in the vicinity of the center or the center in the width direction of the road and to then stop before the stop line such that the vicinity of the center or the center in the width direction of the vehicle is aligned with the vicinity of the center or the center in the length direction of the stop line in the width direction of the road when there is no oncoming vehicle a predetermined distance in front of the vehicle in the road in which a center line for partitioning traffic directions of vehicles is provided and a first side of the center line and a second side opposite to the first side do not have the same width, and
   controlling the vehicle to travel such that the vehicle does not protrude to the second side opposite to the first side on which the vehicle travels and to then stop before the stop line such that the vehicle does not protrude to the second side when there is no oncoming vehicle a predetermined distance in front of the vehicle in the road in which a center line for partitioning traffic directions of vehicles is provided and a first side of the center line and a second side opposite to the first side have the same width.

7. The vehicle control method according to claim 1, further comprising:
   controlling the vehicle to travel based on whether a center line is provided in the road and a width of a lane on a first side of the center line and a width of a lane on a side opposite to the first side, and controlling the vehicle to travel based on a road marking marked on the road and then to stop such that the vehicle does not protrude in the width direction of the stop line.

8. The vehicle control method according to claim 1, further comprising:
- determining that whether to recognize a road marking which is present before the stop line or not, wherein the road marking indicates that the stop line is existing; and
- based on it being determined that the road marking is recognized, controlling, the vehicle to travel at a time of (A), (B), or (C) such that the vicinity of the center or the center of the width direction of the vehicle is aligned with the vicinity of the center or the center in the width direction of the road marking in the width direction of the road,
- the time of (A) is after (i) and before stopping before the stop line when recognizing the road marking,
- the time of (B) is after (ii) and before stopping before the stop line when recognizing the road marking, and
- the time of (C) is after (iii) and before stopping before the stop line when recognizing the road marking.

9. A vehicle control device comprising:
- a first controller configured to recognize surrounding conditions of a vehicle; and
- a second controller configured to control a speed and a steering of the vehicle based on the surrounding conditions of the vehicle recognized by the first controller,
- wherein the second controller is configured to control the vehicle to stop before a stop line recognized by the first controller such that the vicinity of a center or the center in a width direction of the vehicle is aligned with the vicinity of a center or the center in a length direction of the stop line in a width direction of a road,
- based on the vehicle traveling in a roadway of a road, the road is a road in which the roadway and a walkway are partitioned, a width of the road is a width in which the vehicle and an oncoming vehicle can pass each other at low speeds and cannot pass each other at high speeds, the first controller is configured to determine whether it is possible to recognize a center line of the roadway of the road or not when recognizing a stop line in front of the vehicle, a presence of a pedestrian, and there is no oncoming vehicle, wherein the presence of the pedestrian comprises at least one of: a pedestrian crossing on a far side of the stop line, a pedestrian walking on the pedestrian crossing, and a pedestrian about to walk on the pedestrian crossing,
- based on it not being possible for the first controller to recognize the center line, the second controller is configured to control the vehicle to travel such that (i) a vicinity of the center or the center of a width direction of the vehicle is aligned with the vicinity of the center or the center in the width direction of the road and to then stop before the stop line such that the vicinity of the center or the center in the width direction of the vehicle is aligned with the vicinity of the center or the center in the length direction of the stop line in the width direction of the road,
- based on it being possible for the first controller to recognize the center line, the first controller is configured to determine whether a first side of the center line and a second side opposite to the first side are a same width or not,
- based on the first side and the second side being determined by the first controller to not be the same width, the second controller is configured to control the vehicle to (ii) travel in the vicinity of the center or the center in the width direction of the road and to then stop before the stop line such that the vicinity of the center or the center in the width direction of the vehicle is aligned with the vicinity of the center or the center in the length direction of the stop line in the width direction of the road, and
- based on the first side and the second side being determined by the first controller to be the same width, the second controller is configured to control the vehicle to travel such that (iii) the vehicle does not protrude to the second side opposite to the first side on which the vehicle travels and to then stop before the stop line such that the vehicle does not protrude to the second side.

10. A non-transitory computer readable storage medium that stores a program to be executed by a computer to at least:
- recognize surrounding conditions of a vehicle;
- control a speed and a steering of the vehicle based on the recognized surrounding conditions of the vehicle; and
- control the vehicle to stop before a stop line such that the vicinity of a center or the center in a width direction of the vehicle is aligned with the vicinity of a center or the center in a length direction of the stop line in a width direction of a road,
- based on the vehicle traveling in a roadway of a road, the road is a road in which the roadway and a walkway are partitioned, a width of the road is a width in which the vehicle and an oncoming vehicle can pass each other at low speeds and cannot pass each other at high speeds, determine whether it is possible to recognize a center line of the roadway of the road or not when a stop line in front of the vehicle is recognized, a presence of a pedestrian, and there is no oncoming vehicle, wherein the presence of the pedestrian comprises at least one of: a pedestrian crossing on a far side of the stop line, a pedestrian walking on the pedestrian crossing, and a pedestrian about to walk on the pedestrian crossing,
- based on it not being possible to recognize the center line, control the vehicle to travel such that (i) a vicinity of the center or the center of a width direction of the vehicle is aligned with the vicinity of the center or the center in the width direction of the road and to then stop before the stop line such that the vicinity of the center or the center in the width direction of the vehicle is aligned with the vicinity of the center or the center in the length direction of the stop line in the width direction of the road,
- based on it being possible to recognize the center line, determine whether a first side of the center line and a second side opposite to the first side are a same width or not,
- based on the first side and the second side being determined to not be the same width, control the vehicle to (ii) travel in the vicinity of the center or the center in the width direction of the road and to then stop before the stop line such that the vicinity of the center or the center in the width direction of the vehicle is aligned with the vicinity of the center or the center in the length direction of the stop line in the width direction of the road, and
- based on the first side and the second side being determined to be the same width, control the vehicle to travel such that (iii) the vehicle does not protrude to the second side opposite to the first side on which the vehicle travels and to then stop before the stop line such that the vehicle does not protrude to the second side.

* * * * *